US008411603B2

(12) United States Patent
Kong

(10) Patent No.: US 8,411,603 B2
(45) Date of Patent: Apr. 2, 2013

(54) METHOD AND SYSTEM FOR DUAL DIGITAL MICROPHONE PROCESSING IN AN AUDIO CODEC

(75) Inventor: Hongwei Kong, Denville, NJ (US)

(73) Assignee: Broadcom Corporation, Irvine, CA (US)

( * ) Notice: Subject to any disclaimer, the term of this patent is extended or adjusted under 35 U.S.C. 154(b) by 520 days.

(21) Appl. No.: 12/200,091

(22) Filed: Aug. 28, 2008

(65) Prior Publication Data

US 2009/0316731 A1 Dec. 24, 2009

Related U.S. Application Data

(60) Provisional application No. 61/074,018, filed on Jun. 19, 2008.

(51) Int. Cl.
*H04B 3/20* (2006.01)

(52) U.S. Cl. ......... 370/290; 370/352; 370/354; 370/291

(58) Field of Classification Search .................. 370/544, 370/290, 358, 352, 354
See application file for complete search history.

(56) References Cited

U.S. PATENT DOCUMENTS 3,984,636 A * 10/1976 Turner et al. .................... 381/19
4,449,238 A * 5/1984 Lee et al. ...................... 381/110
5,761,198 A * 6/1998 Kojima ......................... 370/337
6,819,912 B2 * 11/2004 Roeckner et al. ............ 455/296
7,142,819 B1 * 11/2006 Kang et al. ................... 455/63.3
7,184,794 B2 * 2/2007 Hess et al. .................... 455/559
7,376,778 B2 * 5/2008 Sinai ............................ 710/312
7,630,504 B2 * 12/2009 Poulsen ........................ 381/111
7,697,947 B2 * 4/2010 Wakefield ..................... 455/502
7,826,621 B2 * 11/2010 Barnhill et al. ................ 381/23
8,089,377 B2 * 1/2012 Wu et al. ........................ 341/61
8,238,547 B2 * 8/2012 Ohki et al. ................. 379/406.1
2002/0032571 A1 * 3/2002 Leung et al. .................. 704/503
2002/0099763 A1 * 7/2002 Kondo et al. ................. 709/201
2002/0180864 A1 * 12/2002 Nakamura et al. ......... 348/14.02
2004/0071106 A1 * 4/2004 Ito et al. ........................ 370/328
2005/0136848 A1 * 6/2005 Murray ........................... 455/79
2005/0149320 A1 * 7/2005 Kajala et al. .................. 704/206
2005/0207596 A1 * 9/2005 Beretta et al. ................. 381/111
2005/0208962 A1 * 9/2005 Kim ........................... 455/550.1
2005/0278044 A1 * 12/2005 Chen et al. ...................... 700/94
2006/0034472 A1 * 2/2006 Bazarjani et al. ............. 381/111

(Continued)

FOREIGN PATENT DOCUMENTS

EP 1 895 670 3/2008
EP 1 927 982 6/2008

(Continued)

OTHER PUBLICATIONS

European Search Report corresponding to European Patent Application No. 09007637.3-2206, dated Oct. 13, 2009.

*Primary Examiner* — Ricky Ngo
*Assistant Examiner* — Dewanda Samuel
(74) *Attorney, Agent, or Firm* — Sterne, Kessler, Goldstein & Fox PLLC

(57) ABSTRACT

Methods and systems for dual digital microphone processing in an audio CODEC are disclosed and may include demultiplexing one or more received time-multiplexed digital audio signals from one or more digital microphones, and separately processing each of the demultiplexed digital audio signals. The digital microphones may include microelectromechanical (MEMS) microphones. The demultiplexed digital audio signals may be level-converted, downshifted, and/or filtered. The filtering may include a finite impulse response (FIR) filter. A sampling rate of the one or more demultiplexed digital audio signals may be converted by repeating the demultiplexed digital audio signals. Audio beamforming and/or diversity processing may be performed utilizing the digital microphones.

20 Claims, 10 Drawing Sheets

U.S. PATENT DOCUMENTS

| | | | | |
|---|---|---|---|---|
| 2006/0056416 | A1* | 3/2006 | Yang et al. | 370/395.2 |
| 2006/0097955 | A1* | 5/2006 | Kato | 345/1.1 |
| 2006/0123063 | A1* | 6/2006 | Ryan et al. | 707/201 |
| 2006/0203845 | A1* | 9/2006 | Monogioudis | 370/466 |
| 2007/0070182 | A1* | 3/2007 | Ryu et al. | 348/14.02 |
| 2007/0132624 | A1* | 6/2007 | Burk et al. | 341/155 |
| 2007/0133826 | A1* | 6/2007 | Burk et al. | 381/122 |
| 2007/0147640 | A1* | 6/2007 | Mottier et al. | 381/111 |
| 2008/0013747 | A1 | 1/2008 | Tran | |
| 2008/0133224 | A1* | 6/2008 | Kong et al. | 704/201 |
| 2008/0133227 | A1* | 6/2008 | Kong et al. | 704/230 |
| 2008/0285517 | A1* | 11/2008 | Igarashi | 370/331 |

FOREIGN PATENT DOCUMENTS

| | | |
|---|---|---|
| EP | 1 928 110 | 6/2008 |
| WO | 98/35301 | 8/1998 |
| WO | 03/028206 | 4/2003 |

* cited by examiner

METHOD AND SYSTEM FOR DUAL DIGITAL MICROPHONE PROCESSING IN AN AUDIO CODEC

CROSS-REFERENCE TO RELATED APPLICATIONS/INCORPORATION BY REFERENCE

This application makes reference to and claims priority to U.S. Provisional Application Ser. No. 61/074,018 filed on Jun. 19, 2008, which is hereby incorporated herein by reference in its entirety.

This application also makes reference to:

U.S. patent application Ser. No. 12/200,022filed on Aug. 28, 2008; and

United States Patent Application Serial No. 12/200,125 filed on Aug. 28, 2008.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing audio signals. More specifically, certain embodiments of the invention relate to a method and system for dual digital microphone processing in an audio CODEC.

BACKGROUND OF THE INVENTION

In audio applications, systems that provide audio interface and processing capabilities may be required to support duplex operations, which may comprise the ability to collect audio information through a sensor, microphone, or other type of input device while at the same time being able to drive a speaker, earpiece of other type of output device with processed audio signal. In order to carry out these operations, these systems may utilize audio coding and decoding (codec) devices that provide appropriate gain, filtering, and/or analog-to-digital conversion in the uplink direction to circuitry and/or software that provides audio processing and may also provide appropriate gain, filtering, and/or digital-to-analog conversion in the downlink direction to the output devices.

As audio applications expand, such as new voice and/or audio compression techniques and formats, for example, and as they become embedded into wireless systems, such as mobile phones, for example, novel codec devices may be needed that may provide appropriate processing capabilities to handle the wide range of audio signals and audio signal sources. In this regard, added functionalities and/or capabilities may also be needed to provide users with the flexibilities that new communication and multimedia technologies provide. Moreover, these added functionalities and/or capabilities may need to be implemented in an efficient and flexible manner given the complexity in operational requirements, communication technologies, and the wide range of audio signal sources that may be supported by mobile phones.

The audio inputs to mobile phones may come from a variety of sources, at a number of different sampling rates, and audio quality. Polyphonic ringers, voice, and high quality audio, such as music, are sources that are typically processed in a mobile phone system. The different quality of the audio source places different requirements on the processing circuitry, thus dictating flexibility in the audio processing systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for dual digital microphone processing in an audio CODEC, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for dual digital microphone processing in an audio CODEC. Exemplary aspects of the invention may comprise demultiplexing one or more received time-multiplexed digital audio signals from one or more digital microphones, and separately processing each of the demultiplexed digital audio signals. The digital microphones may comprise microelectromechanical (MEMS) microphones. The demultiplexed digital audio signals may be level-converted, downshifted, and/or filtered. The filtering may comprise a finite impulse response (FIR) filter. A sampling rate of the one or more demultiplexed digital audio signals may be converted from one sampling rate to at least a second sampling rate by repeating the demultiplexed digital audio signals. The demultiplexed digital audio signals may be sampled at 1.625 or 3.25 MHz.

Figure 1:
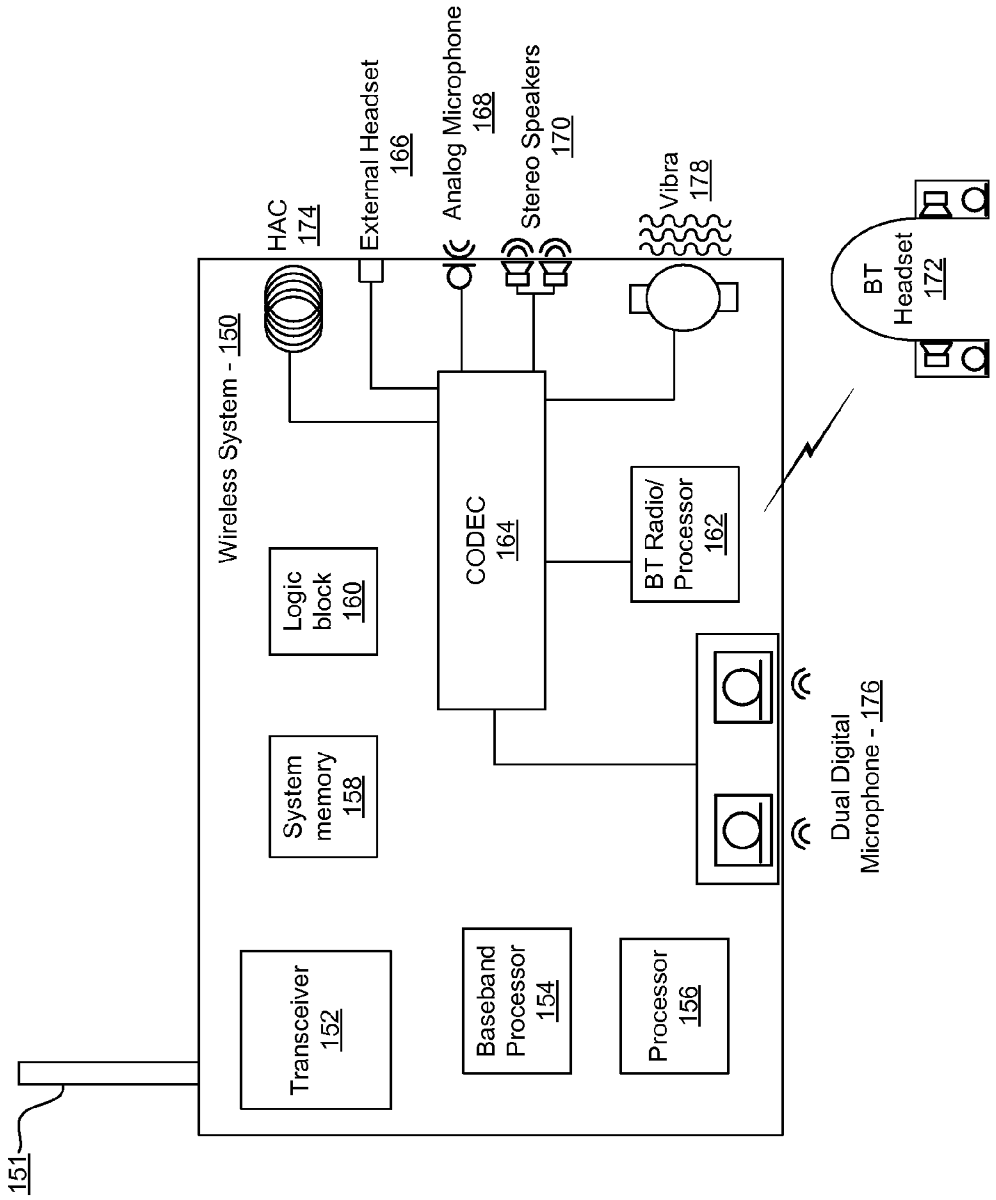
FIG. 1 is a block diagram of an exemplary wireless system, which may be utilized in accordance with an embodiment of the invention.

FIG. 1 is a block diagram of an exemplary wireless system, which may be utilized in accordance with an embodiment of the invention. Referring to FIG. 1, the wireless system 150 may comprise an antenna 151, a transceiver 152, a baseband processor 154, a processor 156, a system memory 158, a logic block 160, a Bluetooth radio/processor 162, a CODEC 164, an external headset port 166, an analog microphone 168, stereo speakers 170, a Bluetooth headset 172, a hearing aid compatible (HAC) coil 174, a dual digital microphone 176, and a vibration transducer 178. The antenna 151 may be used for reception and/or transmission of RF signals.

The transceiver 152 may comprise suitable logic, circuitry, and/or code that may be enabled to modulate and upconvert baseband signals to RF signals for transmission by one or more antennas, which may be represented generically by the antenna 151. The transceiver 152 may also be enabled to downconvert and demodulate received RF signals to baseband signals. The RF signals may be received by one or more antennas, which may be represented generically by the antenna 151. Different wireless systems may use different antennas for transmission and reception. The transceiver 152 may be enabled to execute other functions, for example, filtering the baseband and/or RF signals, and/or amplifying the baseband and/or RF signals. Although a single transceiver 152 is shown, the invention is not so limited. Accordingly, the transceiver 152 may be implemented as a separate transmitter and a separate receiver. In addition, there may be a plurality of transceivers, transmitters and/or receivers. In this regard, the plurality of transceivers, transmitters and/or receivers may enable the wireless system 150 to handle a plurality of wireless protocols and/or standards including cellular, WLAN and PAN.

The baseband processor 154 may comprise suitable logic, circuitry, and/or code that may be enabled to process baseband signals for transmission via the transceiver 152 and/or the baseband signals received from the transceiver 152. The processor 156 may be any suitable processor or controller such as a CPU, DSP, ARM, or any type of integrated circuit processor. The processor 156 may comprise suitable logic, circuitry, and/or code that may be enabled to control the operations of the transceiver 152 and/or the baseband processor 154. For example, the processor 156 may be utilized to update and/or modify programmable parameters and/or values in a plurality of components, devices, and/or processing elements in the transceiver 152 and/or the baseband processor 154. At least a portion of the programmable parameters may be stored in the system memory 158.

Control and/or data information, which may comprise the programmable parameters, may be transferred from other portions of the wireless system 150, not shown in FIG. 1, to the processor 156. Similarly, the processor 156 may be enabled to transfer control and/or data information, which may include the programmable parameters, to other portions of the wireless system 150, not shown in FIG. 1, which may be part of the wireless system 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The system memory 158 may comprise suitable logic, circuitry, and/or code that may be enabled to store a plurality of control and/or data information, including parameters needed to calculate frequencies and/or gain, and/or the frequency value and/or gain value. The system memory 158 may store at least a portion of the programmable parameters that may be manipulated by the processor 156.

The logic block 160 may comprise suitable logic, circuitry, and/or code that may enable controlling of various functionalities of the wireless system 150. For example, the logic block 160 may comprise one or more state machines that may generate signals to control the transceiver 152 and/or the baseband processor 154. The logic block 160 may also comprise registers that may hold data for controlling, for example, the transceiver 152 and/or the baseband processor 154. The logic block 160 may also generate and/or store status information that may be read by, for example, the processor 156. Amplifier gains and/or filtering characteristics, for example, may be controlled by the logic block 160.

The BT radio/processor 162 may comprise suitable circuitry, logic, and/or code that may enable transmission and reception of Bluetooth signals. The BT radio/processor 162 may enable processing and/or handling of BT baseband signals. In this regard, the BT radio/processor 162 may process or handle BT signals received and/or BT signals transmitted via a wireless communication medium. The BT radio/processor 162 may also provide control and/or feedback information to/from the baseband processor 154 and/or the processor 156, based on information from the processed BT signals. The BT radio/processor 162 may communicate information and/or data from the processed BT signals to the processor 156 and/or to the system memory 158. Moreover, BT radio/processor 162 may receive information from the processor 156 and/or the system memory 158, which may be processed and transmitted via the wireless communication medium.

The CODEC 164 may comprise suitable circuitry, logic, and/or code that may process audio signals received from and/or communicated to input/output devices. The input devices may be within or communicatively coupled to the wireless device 150, and may comprise the analog microphone 168, the stereo speakers 170, the Bluetooth headset 172, the hearing aid compatible (HAC) coil 174, the dual digital microphone 176, and the vibration transducer 178, for example. The CODEC 164 may be operable to up-convert and/or down-convert signal frequencies to desired frequencies for processing and/or transmission via an output device. The CODEC 164 may enable utilizing a plurality of digital audio inputs, such as 16 or 18-bit inputs, for example. The CODEC 164 may also enable utilizing a plurality of data sampling rate inputs. For example, the CODEC 164 may accept digital audio signals at sampling rates such as 8 kHz, 11.025 kHz, 12 kHz, 16 kHz, 22.05 kHz, 24 kHz, 32 kHz, 44.1 kHz, and/or 48 kHz. The CODEC 164 may also support mixing of a plurality of audio sources. For example, the CODEC 164 may support audio sources such as general audio, polyphonic ringer, I2S FM audio, vibration driving signals, and voice. In this regard, the general audio and polyphonic ringer sources may support the plurality of sampling rates that the audio CODEC 164 is enabled to accept, while the voice source may support a portion of the plurality of sampling rates, such as 8 kHz and 16 kHz, for example.

The audio CODEC 164 may utilize a programmable infinite impulse response (IIR) filter and/or a programmable finite impulse response (FIR) filter for at least a portion of the audio sources to compensate for passband amplitude and phase fluctuation for different output devices. In this regard, filter coefficients may be configured or programmed dynamically based on current operations. Moreover, filter coefficients may be switched in one-shot or may be switched sequentially, for example. The CODEC 164 may also utilize a modulator, such as a Delta-Sigma ($\Delta$-$\Sigma$) modulator, for example, to code digital output signals for analog processing.

The external headset port 166 may comprise a physical connection for an external headset to be communicatively coupled to the wireless system 150. The analog microphone 168 may comprise suitable circuitry, logic, and/or code that may detect sound waves and convert them to electrical signals via a piezoelectric effect, for example. The electrical signals generated by the analog microphone 168 may comprise analog signals that may require analog to digital conversion before processing.

The stereo speakers 170 may comprise a pair of speakers that may be operable to generate audio signals from electrical signals received from the CODEC 164. The Bluetooth headset 172 may comprise a wireless headset that may be communicatively coupled to the wireless system 150 via the Bluetooth radio/processor 162. In this manner, the wireless system 150 may be operated in a hands-free mode, for example.

The HAC coil 174 may comprise suitable circuitry, logic, and/or code that may enable communication between the wireless device 150 and a T-coil in a hearing aid, for example. In this manner, electrical audio signals may be communicated to a user that utilizes a hearing aid, without the need for generating sound signals via a speaker, such as the stereo speakers 170, and converting the generated sound signals back to electrical signals in a hearing aid, and subsequently back into amplified sound signals in the user's ear, for example.

The dual digital microphone 176 may comprise suitable circuitry, logic, and/or code that may be operable to detect sound waves and convert them to electrical signals. The electrical signals generated by the dual digital microphone 176 may comprise digital signals, and thus may not require analog to digital conversion prior to digital processing in the CODEC 164. The dual digital microphone 176 may enable audio beamforming and/or diversity processing capabilities, for example. Although dual digital microphones 176 are illustrated, the invention is not limited in this regard. Accordingly, more than two digital microphones may be processed by the single hardware audio CODEC 164 without departing from the spirit and scope of the invention.

The vibration transducer 178 may comprise suitable circuitry, logic, and/or code that may enable notification of an incoming call, alerts and/or message to the wireless device 150 without the use of sound. The vibration transducer may generate vibrations that may be in synch with, for example, audio signals such as speech or music.

In operation, control and/or data information, which may comprise the programmable parameters, may be transferred from other portions of the wireless system 150, not shown in FIG. 1, to the processor 156. Similarly, the processor 156 may be enabled to transfer control and/or data information, which may include the programmable parameters, to other portions of the wireless system 150, not shown in FIG. 1, which may be part of the wireless system 150.

The processor 156 may utilize the received control and/or data information, which may comprise the programmable parameters, to determine an operating mode of the transceiver 152. For example, the processor 156 may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the system memory 158 via the processor 156, for example. The information stored in system memory 158 may be transferred to the transceiver 152 from the system memory 158 via the processor 156.

The CODEC 164 in the wireless system 150 may communicate with the processor 156 in order to transfer audio data and control signals. Control registers for the CODEC 164 may reside within the processor 156. The processor 156 may exchange audio signals and control information via the system memory 158. The CODEC 164 may up-convert and/or down-convert the frequencies of multiple audio sources for processing at a desired sampling rate.

In an exemplary embodiment of the invention, the audio CODEC 164 may comprise dual digital microphone processing paths. In this manner, analog to digital conversion may be bypassed, and may also enable audio beamforming.

Figure 2:
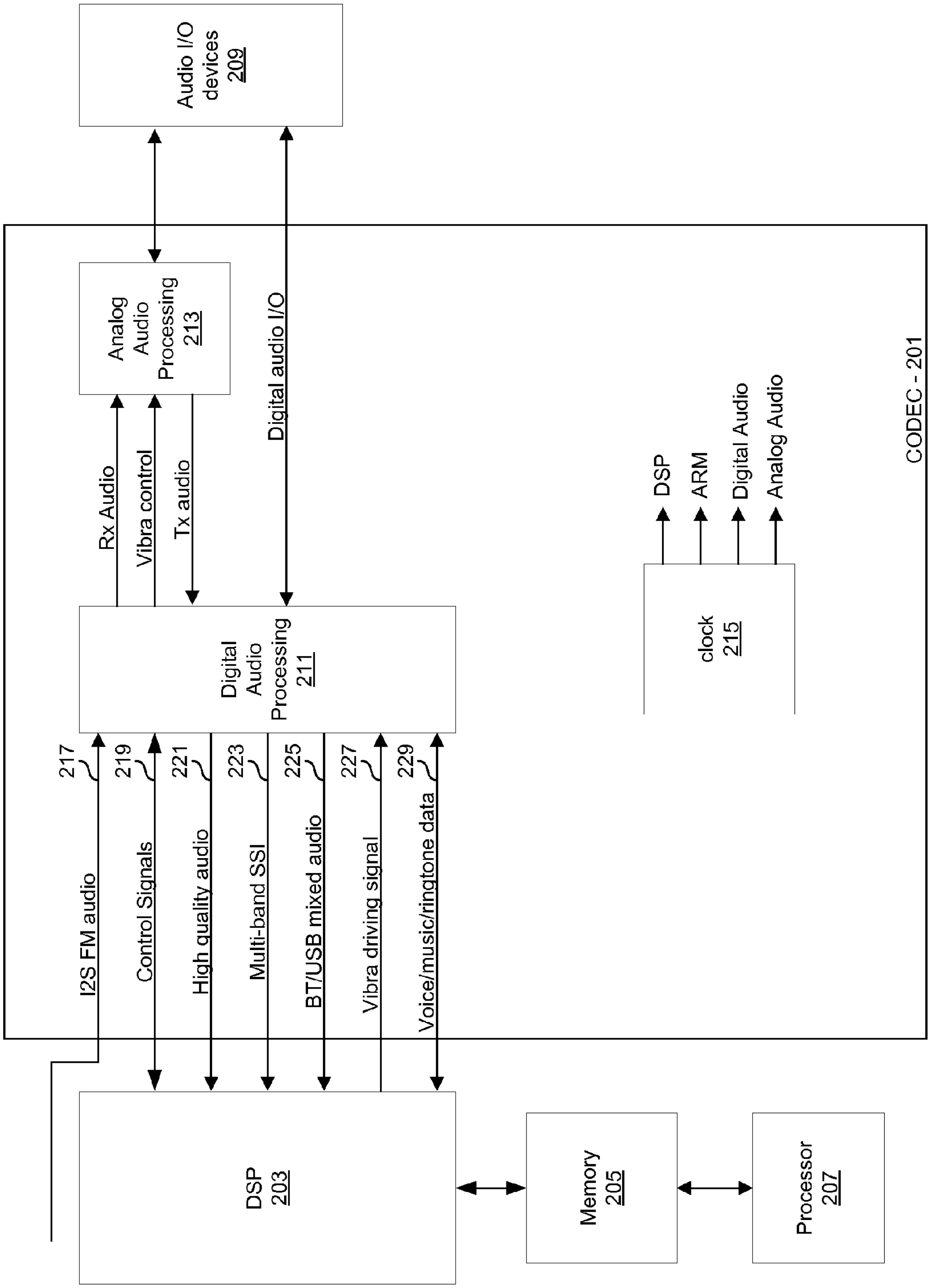
FIG. 2 is a block diagram illustrating an exemplary audio CODEC interconnection, in accordance with an embodiment of the invention.

FIG. 2 is a block diagram illustrating an exemplary audio CODEC interconnection, in accordance with an embodiment of the invention. Referring to FIG. 2, there is shown a CODEC 201, a digital signal processor (DSP) 203, a memory 205, a processor 207, and an audio I/O devices block 209. There is also shown input and output signals for the digital audio processing block 211 comprising an $I^2S$ FM audio signal 217, control signals 219, voice/audio signal 221, a multi-band SSI signal 223, a mixed audio signal 225, a vibration driving signal 227, and a voice/music/ringtone data signal 229. The memory 205 may be substantially to the system memory 158. In another embodiment of the invention, the memory 205 may comprise a separate memory from the system memory 158.

The CODEC 201 may be substantially similar to the CODEC 164 described with respect to FIG. 1, and may comprise a digital audio processing block 211, an analog audio processing block 213, and a clock 215. The digital audio processing block 211 may comprise suitable circuitry, logic, and/or code that may be operable to process received digital audio signals for subsequent storage and/or communication to an output device. The digital audio processing block 211 may comprise digital filters, such as decimation and infinite impulse response (IIR) filters, for example. The analog audio processing block 213 may comprise suitable circuitry, logic, and/or code that may be operable to process received analog signals for communication to the audio I/O devices block 209 and/or the digital audio processing block 211. The analog audio processing block 213 may enable conversion of analog signals to digital signals and may filter received signals before processing, for example. In addition, the analog audio processing block 213 may provide amplification of received audio signals.

The clock 215 may comprise suitable circuitry, logic, and/or code that may generate a common clock signal that may be utilized by the DSP 203, the processor 207, the digital audio processing block 211, and the analog audio processing block 213. In this manner, the synchronization of multiple audio signals during processing, transmission, and/or playback may be enabled.

The DSP 203 may comprise suitable circuitry, logic, and/or code that may process signals received from the digital audio processing block 211 and/or retrieved from the memory 205. The DSP 203 may also store processed data in the memory 205 or communicate processed data to the digital audio processing block 211. In an embodiment of the invention, the DSP 203 may be integrated on-chip with the CODEC 211.

The processor 207 may comprise suitable circuitry, logic, and/or code that may be operable to perform routine processor functions with, for example, minimal power requirements. In one embodiment of the invention, the processor 207 may comprise an advanced RISC machine processor. Notwithstanding, the invention is not so limited, and other types of processor may be utilized. The processor 207 may be communicatively coupled with the memory 205, and may be operable to store data on and/or retrieve data from the memory 205. The processor 207 may also be operable to communicate data and/or control information between the DSP 203 and/or memory 205 to enable for more signal processing tasks by the DSP 203. For example, the processor 207 may communicate with the DSP to enable signal processing of audio signals.

In operation, the CODEC 201 may communicate with the DSP 203 in order to transfer audio data and control signals, with the exception of FM radio listening and recording, where digital FM samples may be read from an 12S directly off a Bluetooth FM receiver, such as the Bluetooth radio/processor described, with respect to FIG. 1. Control registers for the CODEC 201 may, for example, reside in the DSP 203. For voice data, audio samples may not be buffered between the DSP 203 and the CODEC 201. For music and ring-tone, audio data from the DSP 203 may be written into a FIFO, for example, within the CODEC 201 which may then fetch the data samples. A similar method may be utilized for the high quality audio 221, which may sample at 48 KHz, for example. Audio data passing between the DSP 203 and the CODEC 201 may be accomplished via interrupts. These interrupts may comprise interrupts for voice/music/ring-tone data 229, the mixed audio signal 225 at 44.1 KHz/48 KHz for Bluetooth/USB, high quality audio 221 at 48 KHz, and for the vibration driving signal 227. Interrupts may be shared between different inputs and outputs.

The audio sample data for the voice/music/ringtone data 229 in the audio receive path and the high quality audio 221 in the audio transmit path may comprise 18-bit width per sample, for example. In instances where 16-bit audio data may be present, the same 18-bit format may be used, with the two least significant bits (LSBs) zeroed, for example.

In an embodiment of the invention, the DSP 203 and the processor 207 may exchange audio data and control information via a shared memory, for example, memory 205. The processor 207 may write pulse-code modulated (PCM) audio directly into the memory 205, and may also pass coded audio data to the DSP 203 for computationally intensive processing. In this instance, the DSP 203 may decode the data and write the PCM audio back into the memory 205 for the processor 207 to access or to be delivered to the CODEC 201. The processor 207 may communicate with the CODEC 201 via the DSP 203.

In an exemplary embodiment of the invention, the audio CODEC 201 may comprise dual digital microphone processing paths. In this manner, analog to digital conversion in the analog audio processing block 213 may be bypassed, and may also enable audio beamforming. By utilizing one or more digital microphones, the signals received from the individual microphones may be weighted to amplify sounds emanating from a particular region, so as to maximize the received signal from a person's voice, for example. Noise signals may be cancelled by comparing signals from a plurality of microphones. Similarly, diversity may be utilized to obtain a maximum signal by varying the amplification of individual microphones.

Figure 3:
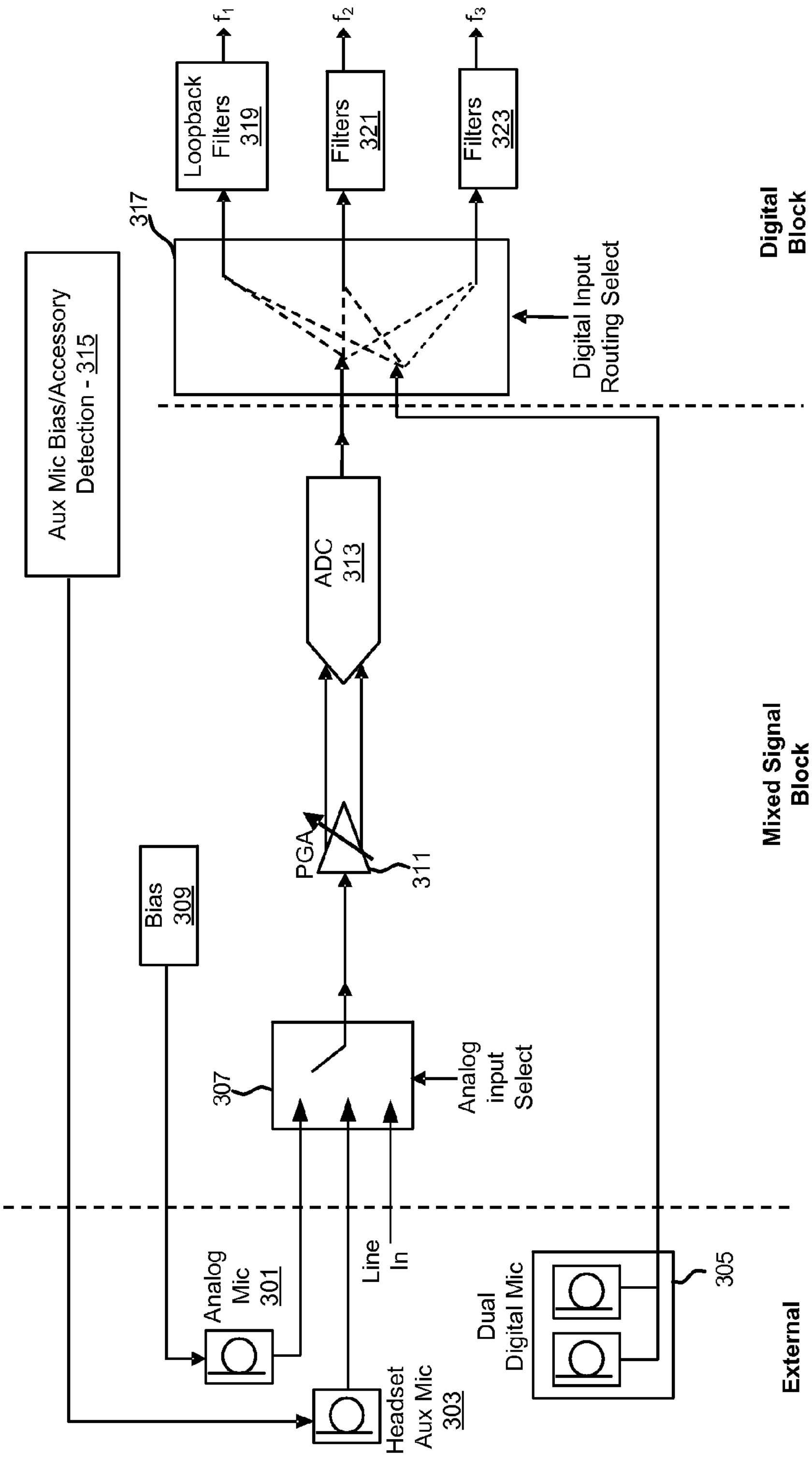
FIG. 3 is a block diagram of an exemplary audio transmit processing system in accordance with an embodiment of the invention.

FIG. 3 is a block diagram of an exemplary audio transmit processing system in accordance with an embodiment of the invention. Referring to FIG. 3, there is shown an analog microphone 301, a headset auxiliary microphone 303, a dual digital microphone 305, an analog input select switch 307, a bias circuit 309, a programmable gain amplifier (PGA) 311, an analog to digital converter (ADC) 313, an auxiliary microphone bias and accessory detection block 315, a digital input routing switch 317, a loopback filter block 319, and digital filters 321 and 323. There is also shown an analog input select signal and a digital input routing select signal.

The analog microphone 301, the headset auxiliary microphone 303, and the dual digital microphone 305 may be located external to the CODEC 201, described with respect to FIG. 2. The bias circuit 309, the analog input select switch 307, the PGA 311, and the ADC 313 may comprise a mixed-signal block in the CODEC 201, whereas the digital input routing switch 317, the loopback filters 319, and the filters 321 and 323 may comprise a digital block in the CODEC 201. The auxiliary microphone bias and accessory detection block 315 may comprise circuitry within the mixed signal and the digital blocks of the CODEC 201.

The analog microphone 301 may comprise suitable circuitry, logic, and/or code that may be operable to detect sound waves and convert them to electrical signals via a piezoelectric effect, for example. The electrical signals generated by the analog microphone 301 may comprise analog signals that may require analog to digital conversion before processing. The analog microphone 301 may be integrated in the wireless system 150, as described with respect to FIG. 1.

The headset auxiliary microphone 303 may comprise suitable circuitry, logic, and/or code that may be operable to detect sound waves and convert them to electrical signals via a piezoelectric effect, for example. The electrical signals generated by the analog microphone 301 may comprise analog signals that may require analog to digital conversion before processing. The headset auxiliary microphone 303 may be integrated in a headset that may be communicatively coupled with the wireless system 150.

The dual digital microphone 305 may comprise suitable circuitry, logic, and/or code that may be operable to detect sound waves and convert them to electrical signals. The electrical signals generated by the dual digital microphone 305 comprise digital signals, at 1.625 MHz or 3.25 MHz, for example, and thus may not require analog to digital conversion prior to digital processing. The dual digital microphone 305 may comprise a micro-electromechanical systems (MEMS) microphone, for example.

The analog input select switch 307 may comprise suitable circuitry, logic, and/or code that may be operable to select which analog source signal may be communicated to the PGA 311. The analog input select switch 307 may receive as inputs the analog signals generated by the analog microphone 301, the headset auxiliary microphone 303, and the Line In signal, The analog input select signal may determine which of the analog signals to communicate to the PGA 311. In this manner, multiple analog sources may be utilized while only requiring one ADC, the ADC 313. The invention is not limited to the number of analog sources shown in FIG. 3. Accordingly, the number of microphones or other input sources may be any number as required by the wireless system 150.

The bias circuit 309 may comprise suitable circuitry, logic, and/or code that may be operable to bias the analog microphone 301 for proper operation. The auxiliary microphone bias and accessory detection block 315 may comprise circuitry, logic, and/or code that may determine when the headset auxiliary microphone 303 may be present and may then bias accordingly for proper operation.

The ADC 313 may comprise suitable circuitry, logic, and/or code that may convert an analog signal to a digital signal. The ADC 313 may receive as an input signal, the signal generated by the PGA 311, and may communicate an output digital signal to the digital input routing switch 317. The ADC 313 may comprise a second-order delta-sigma modulator, for example.

The digital input routing switch 317 may comprise suitable circuitry, logic, and/or code that may be operable to select which digital source signal may be communicated to the loopback filters 319 and the digital filters 321 and 323. The digital input routing switch 317 may receive as inputs the digital signals generated by the ADC 313 and the dual digital microphone 305, as well as the digital input routing select signal to determine where each of the digital signals may be directed. In this manner, multiple digital sources may be utilized while only requiring a single loopback path. The invention is not limited to the number of digital sources shown in FIG. 3. Accordingly, the number of digital microphones or other digital input sources may be any number as required by the wireless system 150.

The loopback filters 319 may comprise suitable circuitry, logic, and/or code that may enable filtering unwanted signals from looping back into the desired audio signals at an excessive level. For example, the audio signals from a microphone may be desired in the audio signal played back by a speaker, but not at a significant volume. The loopback filters may also perform sampling rate conversion so that the signals looped back to the playback path may be at the acceptable sampling rate for the playback. For example, the ADC signal may be sampled at 26 MHz while the playback DAC accepts 6.5 MHz sampled data.

The digital filters 321 and 323 may comprise suitable circuitry, logic, and/or code that may be operable to filter the received digital signal prior to processing in the digital audio processing block, described with respect to FIG. 2. The digital filter may also convert the sampling frequency of the signal received to a desired sampling frequency for subsequent processing, such that multiple digital input signals may share the same processing hardware.

In operation, the analog microphone 301 and the headset auxiliary microphone 303 may be operable to receive sound signals and convert them into electrical signals that may be communicated to the analog input select switch 307. The analog input select signal may define which analog signal may be communicated to the PGA 311 for amplification. The signal amplified by the PGA 311 may be communicated to the ADC 313 for conversion to a digital signal. The digital signal generated by the ADC 313 may be communicated to the digital input routing switch 317.

The dual digital microphone 305 may be operable to receive sound signals and may convert them into digital electrical signals. The digital electrical signals may be communicated directly to the digital input routing switch 317, which may be configured by the digital input routing select signal to communicate the received digital signals to the desired filter block, such as the loopback filters 319 and/or the digital filters 321 and 323. In this manner, analog to digital conversion processing may be eliminated and the use of dual digital microphones may enable audio beamforming.

Figure 4:
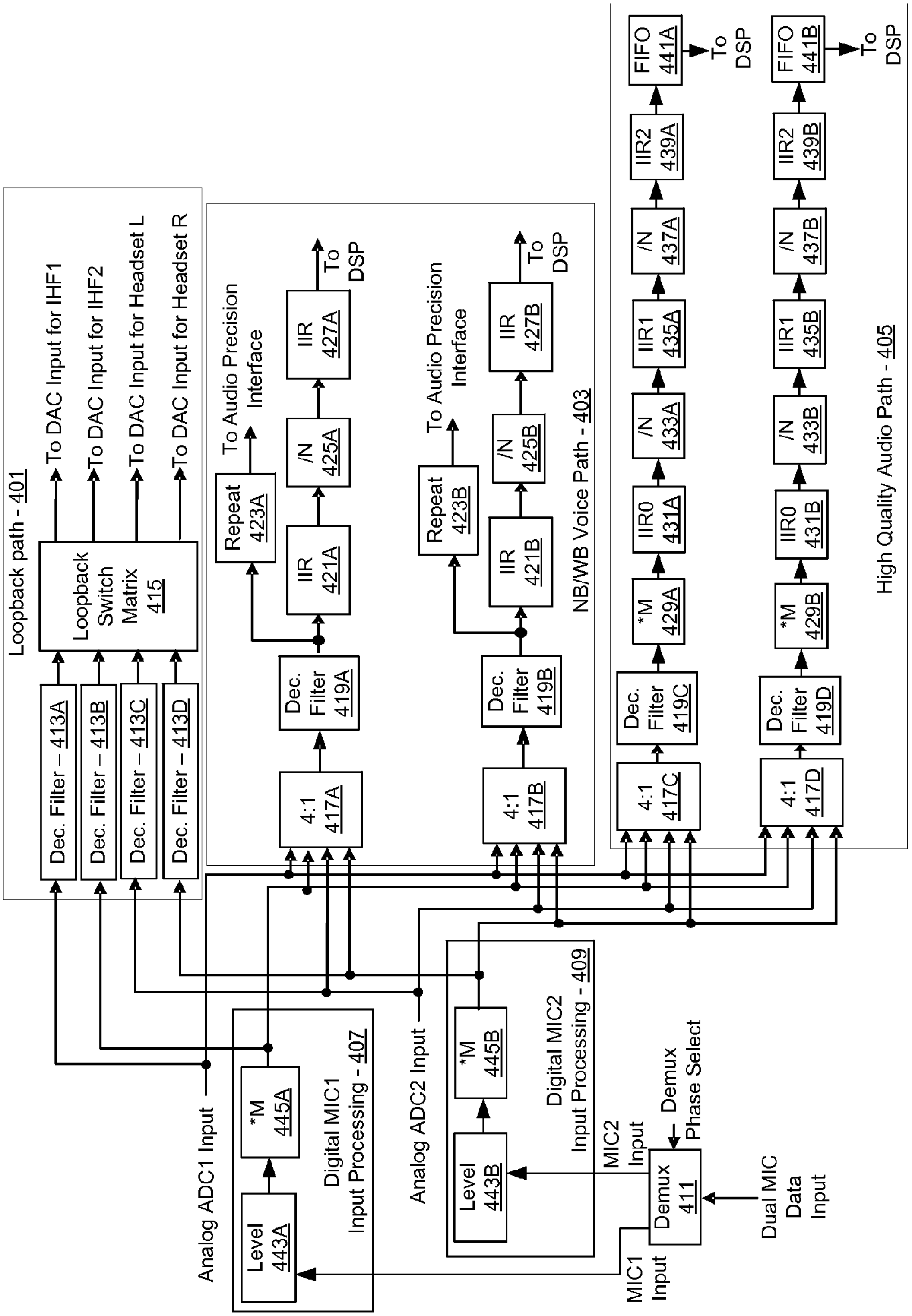
FIG. 4 is a block diagram illustrating exemplary digital audio processing hardware, in accordance with an embodiment of the invention.

FIG. 4 is a block diagram illustrating exemplary digital audio processing hardware, in accordance with an embodiment of the invention. Referring to FIG. 4, there is shown a loopback path 401, a narrow band/wide band (NB/WB) voice path 403, a high quality audio path 405, digital microphone processing blocks 407 and 409, a and a demux 411. The loopback path 401 may comprise decimation filters 413A-413D, and a loopback switch matrix 415. The NB/WB voice path 403 may comprise the 4:1 select blocks 417A and 417B, decimation filters 419A and 419B, infinite impulse response (IIR) filters 421A, 421B, 427A, and 427B, repeat blocks 423A and 423B, and divide-by-N blocks 425A and 425B. The high quality audio path 405 may comprise, 4:1 select blocks 417C and 417D, decimation filters 419C and 419D, multiply-by-M blocks 429A and 429B, IIR0 filters 431A and 431B, divide-by-N blocks 433A, 433B, 437A, and 437B, IIR1 filters 435A and 435B, IIR2 filters 439A and 439B, and FIFO blocks 441A and 441B.

The digital mic1 input processing block 407 may comprise a level block 443A and a multiply-by-M block 445A. The digital mic2 input processing block 409 may comprise a level block 443B and a multiply-by-M block 445B.

The demux 411 may comprise suitable circuitry, logic, and/or code that may be operable to separate two signals from a single received signal. The demux 411 may receive as inputs an output signal generated by a dual digital microphone and a demux phase select signal. The phase select signal may be utilized to configure the demux 411 to communicate the separate signals to appropriate output ports.

The decimation filters 413A-413D may comprise suitable circuitry, logic, and/or code that may enable down-conversion of the sampling frequency of a received signal by an integer value. The decimation filters 413A-413D may be communicatively coupled to the loopback switch 415. The loopback switch 415 may comprise suitable circuitry, logic, and/or code that may communicatively couple each of the signals generated by the decimation filters 413A-413D to desired outputs, such as a DAC input for IHF speakers or headset speakers, for example.

The 4:1 select blocks 417A-417D may comprise suitable circuitry, logic, and/or code that may be operable to select one of four input signals to be communicated as an output signal to a decimation filter for further processing. In this manner, multiple signal sources may be processed by any one of the signal paths, such as either channel of the NB/WB voice path 403 and/or the high quality audio path 405, for example.

The decimation filters 419A-419D may comprise suitable circuitry, logic, and/or code that may enable down-converting the sampling frequency of a received signal by an integer value. The decimation filters 419A-419D may comprise cascaded integrator comb (CIC) filters, for example, and may be utilized to convert a signal frequency down to 40 or 80 kHz, for example. The decimation filters 419A-419D may also comprise a digital gain control.

The IIR filters 421A, 421B, 427A, 427B, 431A, 431B, 435A, 435B, 439A, and 439B may comprise suitable circuitry, logic, and/or code that may be operable to filter received signals to obtained a desired frequency response. The IIR filters 421A, 421B, 427A, 427B, 431A, 431B, 435A, 435B, 439A, and 439B may comprise 2-, 3-, and/or 5-biquad filters, and may compensate for non-ideal microphone response, for example.

The repeat blocks 423A and 423B may comprise suitable circuitry, logic, and/or code that may be operable to upconvert a 40 kHz signal to an 80 kHz for communication to an audio precision interface. The output signal may comprise an 80 kHz, 17 bit data stream, for example.

The divide-by-N blocks 425A, 425B, 433A, and 433B may comprise suitable circuitry, logic, and/or code that may divide the sampling frequency of the received signals by an integer N. Similarly, the multiply-by-M blocks 429A, 429B, 445A, and 445B may comprise suitable circuitry, logic, and/or code that may multiply the sampling frequency of the received signals by an integer M. In this manner, digital samples received at different sampling frequencies may be converted to a common sampling frequency for subsequent processing. The values for M and N may be different for any given divide-by-N or multiply-by-M blocks, depending on the desired sampling frequency.

The FIFO blocks 441A and 441B may comprise suitable circuitry, logic, and/or code that may be operable as a buffer and temporarily store data before being communicated to a DSP, such as the DSP 203 described with respect to FIG. 2.

The level conversion blocks 443A and 443B may comprise suitable circuitry, logic, and/or code that may convert the number of levels of the received signal. For example, the level conversion blocks 443A and 443B may convert received signals from 3.25 MHz, 2-level signal to a 3.25 MHz, 3-level signal.

In operation, a digital microphone, such as the dual digital microphone 305, described with respect to FIG. 3, may generate a digital signal that may be demultiplexed by the demux 411 to generate two signals, the MIC1 and MIC2 inputs. The MIC1 and MIC2 inputs may be converted to a 3-level signal, for example, by the level conversion blocks 443A and 443B. The converted signals may be upconverted by the multiply-by-M blocks 445A and 445B, creating two of the fours signals that may be selected for processing by the loopback path 401, the NB/WB voice path 403, and/or the high quality audio path 405. The ADC1 and ADC2 input signals may comprise the remaining two signals that may be selected.

The loopback path 401 may be utilized to communicate any of the four inputs, such as from digital or analog microphones, stereo line in, or FM signals, for example, and may route the received signals to a DAC delta-sigma modulator. To achieve this, for example, a 3-level 26 MHz signal may be down-sampled by a factor of 4 to 6.5 MHz 23-bit by the decimation filters 413A-413D, and then may be routed to a DAC delta-sigma modulator.

In an exemplary embodiment of the invention, a 3-level 26 MHz signal may be selected in the NB/WB voice path 403 from the 4 input sources and down-sampled to 40 KHz/80 KHz, depending on the final ADC output sampling rate (8 KHz/16 KHz), via a CIC decimation filter, for example. The decimation filters 419A and 419B may be dependent on the final ADC output sampling rate, such that the frequency response for a higher sampling rate (16 KHz) may be greatly improved. The output of the decimation filters 419A and 419B may be communicated to an Audio Precision interface via a repeat block 423A or 423B and also to the IIR filters 421A and 421B. The NB/WB audio path may comprise two parallel and identical processing branches, and the input to each branch may be selected independently. The output sampling frequency may also be independently configured. In this manner, the NB/WB voice path 403 may utilize a lower sampling frequency for voice communication and a higher sampling for recording, for example.

In an exemplary embodiment of the invention, a 3-level, 26 MHz signal may be selected in the high quality audio path 405, independently of the NB/WB voice path 403, and down-sampled to 48 kHz via a cascade of decimation and IIR filters, for example. The high quality audio path 405 may comprise two parallel processing branches, and the input to each branch may be selected independently.

In an embodiment of the invention, the digital microphone processing blocks 407 and 409 may receive digital audio signals from a dual digital microphone via the demux 411. The received digital audio signals may be processed by the digital microphone processing blocks 407 and 409 before communicating the processed signals to the 4:1 select blocks 417A-417D in the NB/WB voice path 403 or the high quality audio path 405, or to the decimation filters 413B or 413D in the loopback path 401.

Figure 5:
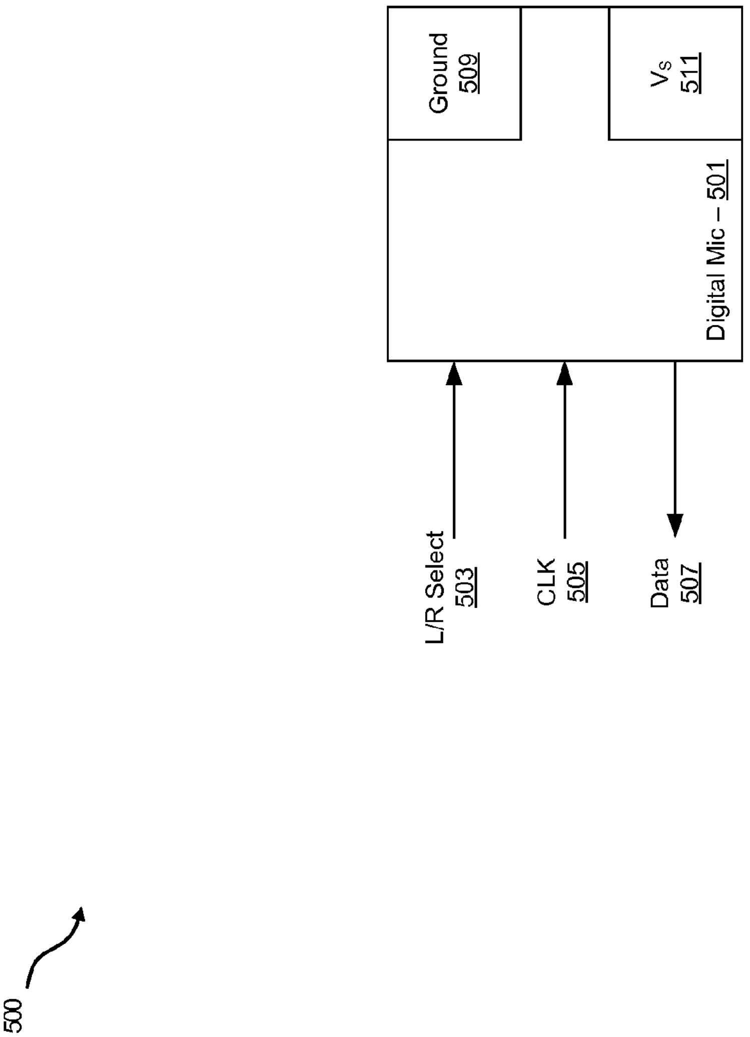
FIG. 5. is a block diagram illustrating an exemplary digital microphone interface, in accordance with an embodiment of the invention.

FIG. 5. is a block diagram illustrating an exemplary digital microphone interface, in accordance with an embodiment of the invention. Referring to FIG. 5, there is shown the digital microphone interface 500 comprising the digital microphone 501, the left/right (L/R) select input 503, the clock input 505, the data output 507, the ground input 509, and the source voltage input 511.

The digital microphone 501 may comprise suitable circuitry, logic, and/or code that may be operable to detect sound waves and convert them to electrical signals. The electrical signals generated by the dual digital microphone 501 may comprise digital signals, at 1.625 MHz or 3.25 MHz, for example, and thus may not require analog to digital conversion prior to digital processing. The digital microphone 501 may comprise a micro-electromechanical systems (MEMS) microphone, for example.

The L/R select signal 503 may configure which clock edge to output data, for example, and may also be utilized to enable dual microphone operation, such that a single clock signal may be used to drive both digital microphones and the resulting output bit streams from both microphones may be multiplexed together into a single data stream. In an exemplary embodiment of the invention, a '0' value for the L/R select signal 503 may indicate data may be asserted at clock falling edge and sampled at clock rising edge. Conversely, a '1' may indicate data may be asserted at clock rising edge and sampled at clock falling edge.

The clock input 505 may comprise a clock signal generated by a clock source CODEC 201, such as the clock 215, described with respect to FIG. 2. In an exemplary embodiment of the invention, the clock signal may comprise a 1-3.25 MHz, 50% duty cycle signal.

The data signal 507 may comprise the output signal of the digital microphone 501 and may comprise a binary bit sequence to be communicated to digital processing circuitry, such as the digital audio processing block 211 described with respect to FIG. 2.

The ground input 509 may comprise a ground path and the source voltage input 511 may comprise a voltage source to power the digital microphone 501.

In operation, power may be supplied to the digital microphone 501 via the ground input 509 and the source voltage input 511. A clock signal may be communicated via the clock input 505, and a L/R select signal 503 may configure the data assertion and sampling. In this manner, the digital microphone 501 may be operable to detect sound signals and communicate them to digital circuitry for processing.

Figure 6:
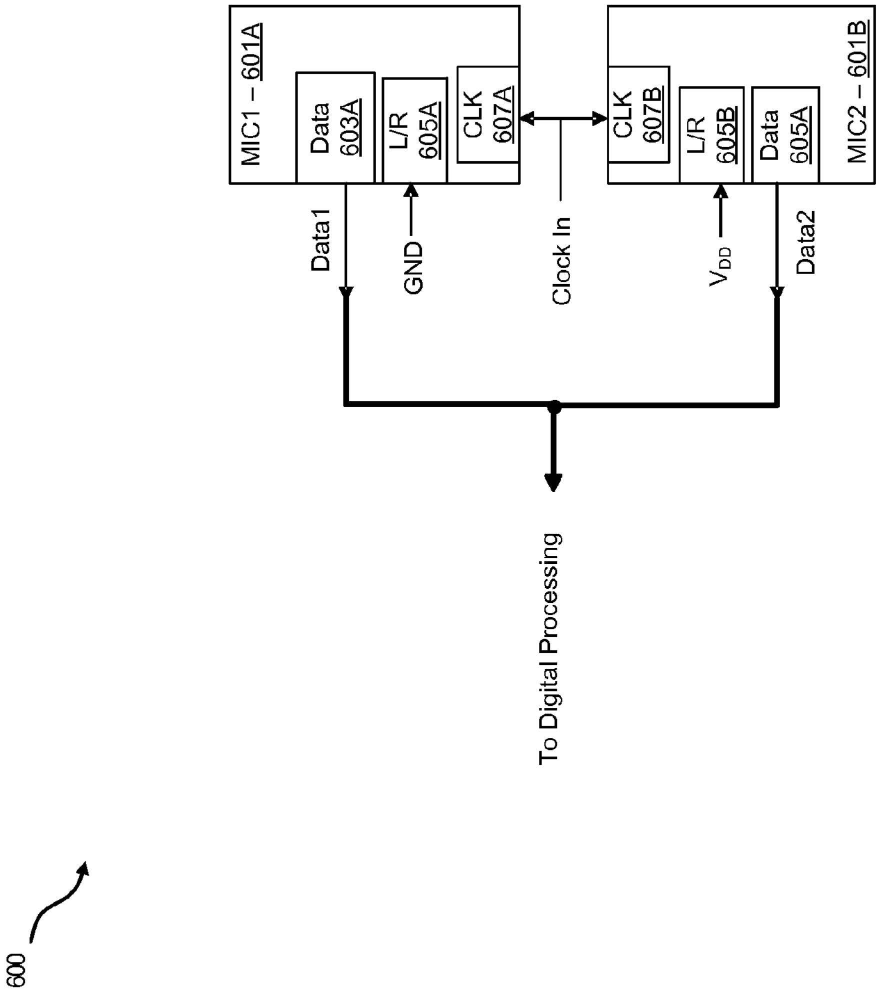
FIG. 6 is a block diagram of an exemplary dual digital microphone interface, in accordance with an embodiment of the invention.

FIG. 6 is a block diagram of an exemplary dual digital microphone interface, in accordance with an embodiment of the invention. Referring to FIG. 6, there is shown a dual digital microphone interface 600 comprising a microphone 1 601A and a microphone 2 601B. The dual digital microphone interface 600 may be substantially similar to the digital microphone interface 500 but with two interfaces, digital microphones 1 601A and 2 601B, in parallel, each substantially similar to the digital microphone interface 500 but without the supply voltage and ground inputs shown. A clock input signal generated by the clock 215, for example, may be communicated to the clock inputs 607A and 607B. Although two digital microphones 601A and 601 B are shown, the invention is not limited in this regard. Accordingly, a digital microphone interface similar to dual digital microphone interface 600 may be provided which may be operable to handle more than two digital microphones without departing from the spirit and scope of the invention.

In operation, the digital microphones 601A and 601B may be operable to detect sound signals and convert them to digital signals, indicated by Data1 and Data2. The digital signals may be time-multiplexed to generate a single digital signal that may subsequently be processed. The data assertion and sampling configuration for the two digital microphones 601A and 601B may be set to opposite values, as indicated by ground being coupled to the L/R input 605A and a supply voltage, VDD, to the L/R input 605B. In this manner, data may be read from each microphone at different times in the clock cycle, allowing for time division multiplexing.

Figure 7:
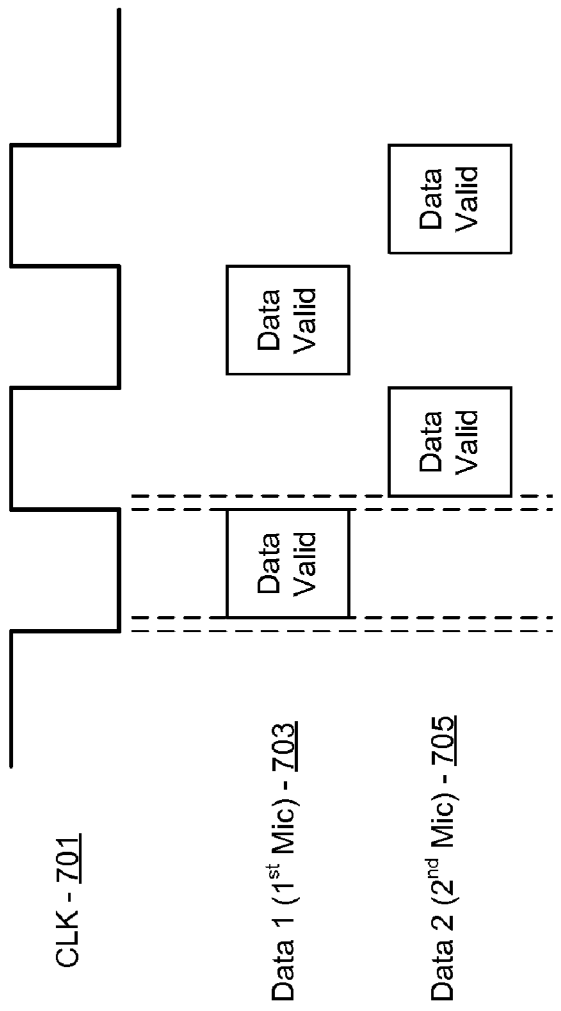
FIG. 7 is a block diagram of an exemplary dual digital microphone data sampling timing schematic, in accordance with an embodiment of the invention.

FIG. 7 is a block diagram of an exemplary dual digital microphone data sampling timing schematic, in accordance with an embodiment of the invention. Referring to FIG. 7, there is shown a clock signal 701, a data1 signal 703, and a data2 signal 705. The clock signal 701 may comprise a signal received from the clock 215, for example, and may represent a 50% duty cycle signal that may be utilized to time the data sampling of a dual digital microphone such as the dual digital microphone 305, described with respect to FIG. 3.

In operation, the falling edges of the clock signal 701 may indicate that data may be sampled from a first microphone resulting in the data1 signal 703, and the rising edges of the clock signal 701 may indicate that data may be sampled from a second microphone resulting in the data2 signal 705. In this manner a time division multiplexed signal may be obtained from a dual digital microphone.

Figure 8:
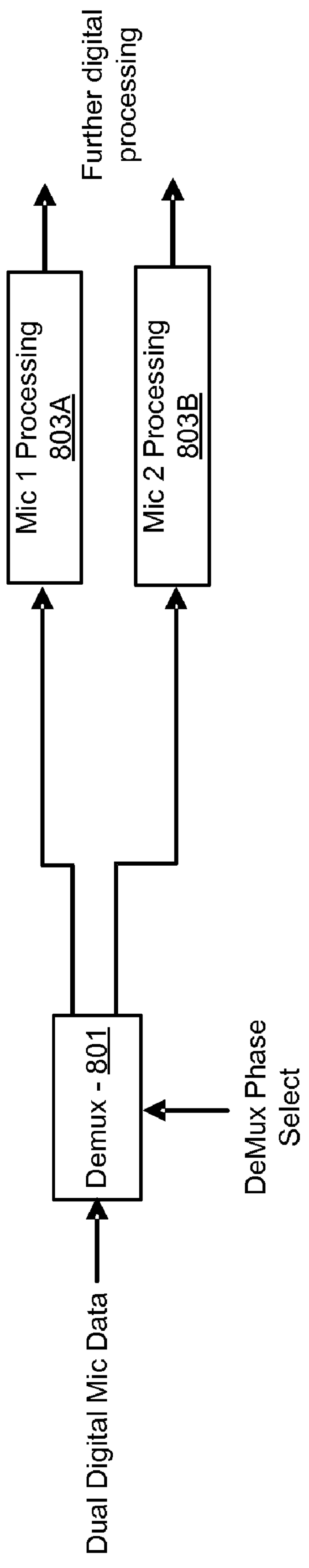
FIG. 8 is a block diagram illustrating exemplary digital microphone processing, in accordance with an embodiment of the invention.

FIG. 8 is a block diagram illustrating exemplary digital microphone processing, in accordance with an embodiment of the invention. Referring to FIG. 8, there is shown a demultiplexer (demux) 801, a microphone 1 processing block 803A and a microphone 2 processing block 803B. There is also shown dual digital microphone data, a demux phase select signal and processed digital microphone data for further digital processing.

The demux 801 may comprise suitable circuitry, logic, and/or code that may be operable to decouple multiple data streams from a single data stream. For example, two digital microphone data signals may be extracted from a time-multiplexed data signal received by the demux 801 and each communicated to corresponding processing circuitry. The data from a first digital microphone may be communicated to the microphone 1 processing block 803A and the data from a second digital microphone may be communicated to the microphone 2 processing block 803B.

The microphone 1 processing block 803A and the microphone 2 processing block 803B may comprise suitable circuitry, logic, and/or code that may be operable to process digital signals, such as by filtering, up and/or down-converting sampling rates, and level shifting, for example.

In operation, the demux 801 may receive a time-multiplexed dual digital microphone data signal and generate two data signals that may be communicated to the microphone 1 processing block 803A and the microphone 2 processing block 803B for processing.

Figure 9:
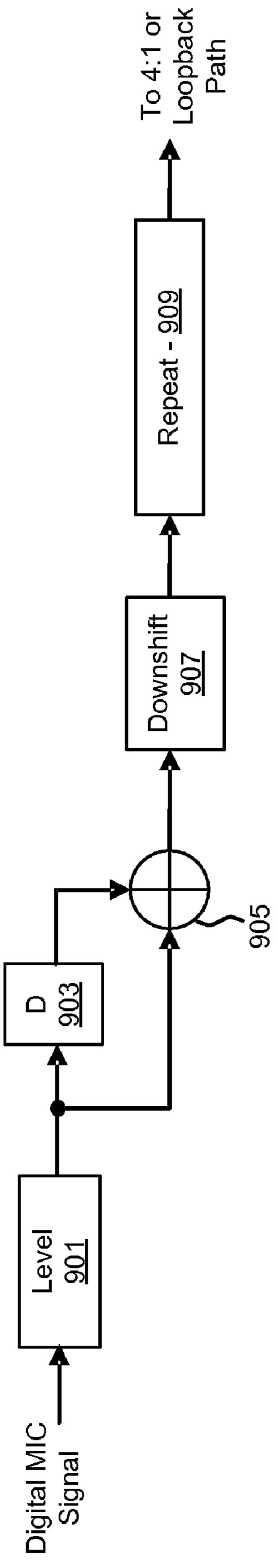
FIG. 9 is a block diagram illustrating an exemplary digital microphone signal processing schematic, in accordance with an embodiment of the invention.

FIG. 9 is a block diagram illustrating an exemplary digital microphone signal processing schematic, in accordance with an embodiment of the invention. Referring to FIG. 9, there is shown a level converter 901, a delay block 903, an adder 905, a downshift block 907, and a repeat block 909.

The level converter 901 may comprise suitable circuitry, logic, and/or code that may be operable to convert the levels of an input digital signal. The delay block 903 and the adder 905 may comprise a 2-tap finite impulse response filter (FIR) with unity coefficients. In this manner, the interconnection of the delay block 903 and the adder 905 may be operable to receive a level shifted 2-level digital signal and generate a 3-level digital signal.

In operation, the level converter 901 may receive a 2-level $\{0, 1\}$ digital signal and generate a 2-level $\{-1, 1\}$ digital signal, for example. The 2-tap FIR filter may receive the level converted signal and generate a 3-level $\{-2, 0, 2\}$ signal that may be communicated to the downshift block 907, which may generate a $\{-1, 0, 1\}$ digital signal that may be repeated by a factor in the repeat block 909 to result in a desired sampling frequency, 26 MHz, for example. The resulting signal may then be suitable for subsequent signal processing in the narrowband and/or wideband (NB/WB) voice path 403 or the high quality audio path 405, or to the decimation filters 413B or 413D in the loopback path 401, for example.

Figure 10:
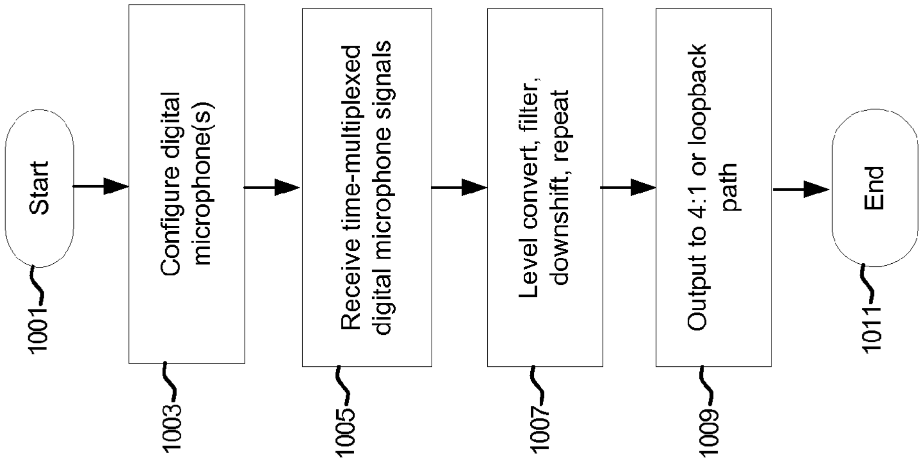
FIG. 10 is a block diagram of exemplary steps in dual digital microphone processing in an audio CODEC, in accordance with an embodiment of the invention.

FIG. 10 is a block diagram of exemplary steps in dual digital microphone processing in an audio CODEC, in accordance with an embodiment of the invention. In step 1003, after start step 1001, a digital microphone may be configured to operate in single or dual mode, for example. In step 1005 the time-multiplexed digital audio signals may be received from the digital microphone. In step 1007, the digital signals may be processed, such as level conversion, filtering, downshifting, or repeating to generate an output signal that may be suitable for further processing. In step 1009, the output signals may be communicated to a 4:1 select block or a loopback for further processing followed by end step 1011.

In an embodiment of the invention, a method and system is described for demultiplexing one or more received time-multiplexed digital audio signals from one or more digital microphones 305, 501, and separately processing each of the demultiplexed digital audio signals. The digital microphones 305, 501 may comprise microelectromechanical (MEMS) microphones. The demultiplexed digital audio signals may be level-converted, downshifted, and/or filtered. The filtering may comprise a finite impulse response (FIR) filter 903/905. A sampling rate of the one or more demultiplexed digital audio signals may be converted from one sampling rate to at least a second sampling rate by repeating the demultiplexed digital audio signals. The demultiplexed digital audio signals may be sampled at 1.625 or 3.25 MHz. Audio beamforming and/or diversity processing may be performed utilizing the digital microphones.

Certain embodiments of the invention may comprise a machine and/or computer readable storage having stored thereon, a machine code and/or a computer program having at least one code section for dual digital microphone processing in an audio CODEC, the at least one code section being executable by a machine and/or a computer for causing the machine and/or computer to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. One embodiment utilizes a commercially available processor, which may be implemented external to an ASIC implementation of the present system. Alternatively, in an embodiment where the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing audio signals, the method comprising:

demultiplexing received time-multiplexed digital audio signals from one or more digital microphones; and separately processing said demultiplexed digital audio signals by:

communicating said demultiplexed digital audio signals to a first digital filter circuit and a second digital filter circuit, determining, using selection modules at said first digital filter circuit and said second digital filter circuit, which of said demultiplexed digital audio signals to select first output signal at said first digital filter circuit and a second output signal at said second digital filter circuit, and processing the first output signal and the second output signal based on said determination.

2. The method according to claim 1, wherein said one or more digital microphones comprise microelectromechanical (MEMS) microphones.

3. The method according to claim 1, comprising level-converting said demultiplexed digital audio signals.

4. The method according to claim 1, comprising converting a sampling rate of said one or more demultiplexed digital audio signals from at least a first sampling rate to at least a second sampling rate.

5. The method according to claim 4, comprising repeating said demultiplexed digital audio signals for said sampling rate conversion.

6. The method according to claim 1, comprising filtering said demultiplexed digital audio signals.

7. The method according to claim 6, comprising filtering said demultiplexed digital audio signals via a finite impulse response (FIR) filter.

8. The method according to claim 1, comprising downshifting said demultiplexed digital audio signals.

9. The method according to claim 1, comprising audio beamforming utilizing said digital microphones.

10. The method according to claim 1, comprising diversity processing utilizing said digital microphones.

11. A system for processing audio signals, the system comprising one or more circuits, wherein said one or more circuits are configured to:

demultiplex received time-multiplexed digital audio signals from one or more digital microphones; and separately process each of said demultiplexed digital audio signals by:

communicating said demultiplexed digital audio signals to a first digital filter circuit and a second digital filter, circuit, determining, using selection modules at said first digital filter circuit and said second digital filter circuit, which of said demultiplexed digital audio signals to select as a first output signal at said first digital filter circuit and a second output signal at said second digital filter circuit, and processing the first output signal and the second output signal based on said determination.

12. The system according to claim 11, wherein said one or more digital microphones comprise microelectromechanical (MEMS) microphones.

13. The system according to claim 11, wherein said one or more circuits are configured to level-convert said demultiplexed digital audio signals.

14. The system according to claim 11, wherein said one or more circuits are configured to convert a sampling rate of said one or more demultiplexed digital audio signals from at least a first sampling rate to at least a second sampling rate.

15. The system according to claim 14, wherein said one or more circuits are configured to repeat said demultiplexed digital audio signals for said sampling rate conversion.

16. The system according to claim 11, wherein said one or more circuits are configured to filter said demultiplexed digital audio signals.

17. The system according to claim 11, wherein said one or more circuits are configured to downshift said demultipiexed digital audio signals.

18. The system according to claim 11, wherein said one or more circuits are configured for audio beamforming utilizing said digital microphones.

19. The system according to claim 11, wherein said one or more circuits are configured for diversity processing utilizing said digital microphones.

20. A system for processing: audio signals, said system comprising:

a demultiplexing circuit configured to demultiplex time-multiplexed digital audio signals received from one or more digital microphones into a first digital microphone input signal and a second digital microphone input signal;

a digital filter circuit, coupled to said demultiplexing circuit, configured to:

receive a plurality of received signals, wherein said received signals include a first analog input signal, a second analog input signal, said first digital microphone input signal, and said second digital microphone input signal, determine one of said plurality of received signals to select as an output signal, and process said output signal based on said determination;

a loopback circuit configured to:

receive said plurality of received signals, and filter said plurality of received signals; and a digital input routing switch, coupled to said loopback circuit and said demultiplexing circuit, configured to route, based on a routing select signal, said time-multiplexed digital audio signals, said first analog input, and said second analog input to said demultiplexing circuit or said loopback circuit.

* * * * *

UNITED STATES PATENT AND TRADEMARK OFFICE

CERTIFICATE OF CORRECTION

PATENT NO. : 8,411,603 B2
APPLICATION NO. : 12/200091
DATED : April 2, 2013
INVENTOR(S) : Hongwei Kong It is certified that error appears in the above-identified patent and that said Letters Patent is hereby corrected as shown below:

In the Claims:

At Column 16, Line 23, please replace “filter,” with -- filter --.

At Column 16, Line 50, please replace “demultipiexed” with -- demultiplexed --.

At Column 16, Line 58, please replace “processing:” with -- processing --.

Signed and Sealed this
Twenty-fourth Day of September, 2013

Teresa Stanek Rea
*Deputy Director of the United States Patent and Trademark Office*